June 6, 1967     A. R. CHASAR     3,323,661
LOAD SENSING APPARATUS Filed Jan. 25, 1965     8 Sheets-Sheet 1

June 6, 1967 A. R. CHASAR 3,323,661
LOAD SENSING APPARATUS
Filed Jan. 25, 1965 8 Sheets-Sheet 2

United States Patent Office 3,323,661
Patented June 6, 1967

3,323,661
LOAD SENSING APPARATUS
Anthony R. Chasar, Mentor, Ohio, assignor to The Triax Company, Cleveland, Ohio, a corporation of Ohio
Filed Jan. 25, 1965, Ser. No. 427,824
19 Claims. (Cl. 214—16.4)

This application is a continuation-in-part of my copending application Ser. No. 367,605, filed May 6, 1964, and entitled, Load Sensing Device.

This invention relates to automatic warehousing systems for storing or unstoring loads by transferring them between a movable carrier and a storage frame and more particularly to a sensing device for stopping the transferring motion of the carrier before collision damage occurs where there is an attempt to store an oversized and/or skewed load, where the carrier leaves a load not fully placed within the storage frame, or where the carrier approaches a load which is projecting from the storage frame. The load sensing device of this invention is particularly adapted for use in an automatic load storage system or apparatus of the general type shown and disclosed in my copending application Ser. No. 66,776, filed Nov. 2, 1960, now abandoned, and entitled, Mechanical Load Handling, Transfer and Storage Equipment.

The automation of warehousing systems involves, generally, the use of a power operated carrier which is provided with control means for causing the carrier to automatically perform a series of sequential movements involving picking up a load at a pick-up station and delivering it to a preselected load support means, retrieving a load from a load support means and returning it to the pick-up station, or picking up a load at one load support means and delivering it to another load support means. As such systems become larger and faster in operation, an operator does not always have the time or opportunity to carefully check the size of each load going into the system or the position of each load stored in the system. The carrier travels either along a narrow aisle or at least in a travel zone closely adjacent to the open ends of the support means whereby a stored load which projects out of its support means can be struck by the moving carrier. If the operator attempts to store an oversized or skewed load, the load is likely to collide with either the storage frame or another load stored therein. Safeguards against such accidents, which can endanger both personnel and material, become increasingly essential as the automated storage art develops. Therefore, there are three major purposes of the sensing device of this invention: to prevent oversized and/or out of position loads from moving onto the carrier, to prevent the carrier from leaving the location of a load not fully placed into the structure, and to sweep across the face of a storage frame to sense loads projecting out of said storage frame.

More specifically, it is an object of this invention to provide a load sensing device which prevents oversized loads from moving onto a carrier of an automatic storage apparatus.

Another object is to provide a load sensing device of the above type which detects loads extending into the path of carrier travel and stops the movement of the carrier before collision between said carrier and the extending loads.

Still another object is to provide a load sensing device as set forth above which reacts to a disarranged load which has just been stored by the carrier and prevents the carrier from moving away from such disarranged load.

It is a further object to provide a load sensing device having the above characteristics which reacts to both vertical and horizontal movement of the carrier.

Yet another object is to provide a load sensing device as set forth above having means providing a barrier disposed in a plane which defines a safety zone of clearance alongside the carrier whereby when an object projects into said plane and the carrier approaches said object, the carrier will be stopped by the object striking the barrier before collision between the carrier and the object.

Another object is to provide such a load sensing device which can be readily actuated manually in an emergency by a person within reach thereof.

Other objects of the invention and the invention itself are disclosed in the following description of three embodiments of the invention as illustrated in the accompanying drawings, in which:

FIG. 13 is a side view of the carrier and load sensing device of FIG. 12;

Figure 1:
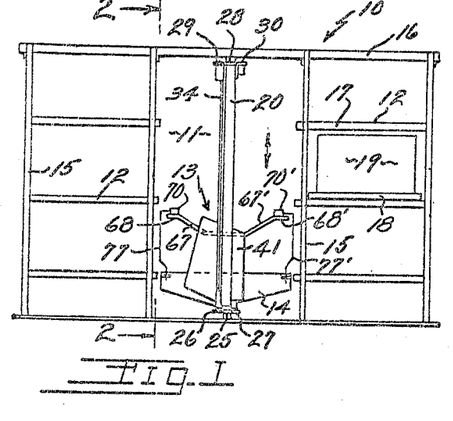
FIG. 1 is an end view of a load storage frame showing a carrier associated therewith, said carrier having mounted thereto the load sensing device of this invention according to the first emodiment thereof.
Figure 2:
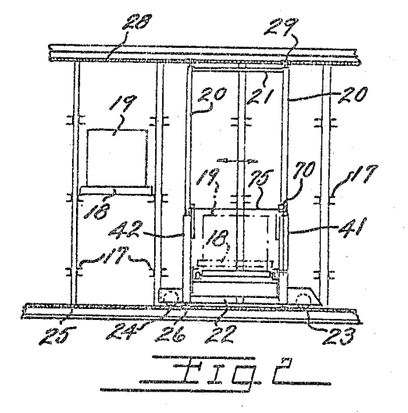
FIG. 2 is a side view of the carrier as seen from the line 2—2 of FIG. 1.

Referring to FIGS. 1 and 2 of the drawings of the present application, an automatic storage system of the general type shown in my copending application comprises a skeletal storage frame 10 having a central aisle 11 with vertically and horizontally arranged load support means 12 disposed on either side of said aisle. A carrier 13 is disposed in the aisle 11 and is adapted for horizontal movement along said aisle past the vertical rows of load support means 12. The carrier 13 has a vertically movable frame 14 which normally runs horizontally at a level slightly below the first level of load support means and which is adapted to move vertically in the aisle 11 to the different levels of the load support means 12. The storage frame 10 generally comprises pairs of rows of vertical posts 15 which are spaced laterally from each other on either side of the aisle 11 and are connected across the top by cross members 16. Transversely aligned pairs of posts 15 on either side of the aisle 11 are connected by load channels 17 which, as seen in FIG. 2, are disposed in mutually directed pairs at different levels to provide the aforementioned load support means 12. Each channel 17 is welded or otherwise suitably secured with its web portion against two transversely aligned posts opposite to a similarly mounted load channel. A load support means 12 is adapted to receive a pallet 18 supported at its edges by a pair of the load channels 17 and carrying thereon a load 19.

The carrier 13 has a pair of vertical masts 20 connected at the top by a frame member 21 and at the bottom by a frame member 22. Wheels 23 and 24 are mounted to the masts 20 for rolling engagement with a lower rail 25 which is disposed centrally and longitudinally of the aisle 11 at the ground level. One side of said lower rail is provided with a rack adapted to engage pinion means 26 disposed on one side of said rail and backed up by roller means 27 disposed on the other side of said rail. The upper ends of the masts 20 are similarly guided along an overhead rail 28 which is provided with a rack at one side thereof to receive pinion means 29 backed up on the other side of the rail by roller means 30.

Figure 4:
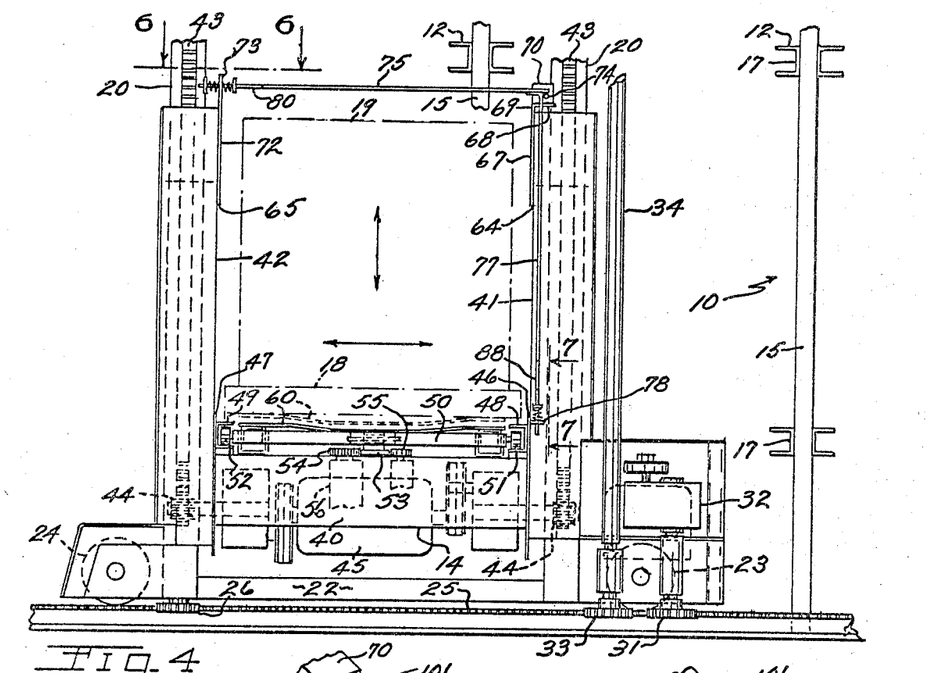
FIG. 4 is an enlarged side view of the carrier.

As best shown in FIG. 4, the pinion means 26 includes at least one drive pinion 31 driven by reversible horizontal drive means 32. The pinion means 26 also includes a pinion 33 connected to the overhead pinion means 29 by a vertical connector shaft 34. It will be readily apparent that the masts 20 are movable horizontally along the aisle 11 in either direction by actuation of the horizontal drive means 32 driving through the pinion 31 engaging the rack of the lower rail 25.

The vertically movable frame 14 is carried by the masts 20 and is movable upwardly and downwardly of said masts to the different levels of the load support means 12. Said vertically movable frame comprises a base 40 having front and rear upright supports 41 and 42, respectively disposed adjacent to the masts 20. The masts 20 carry vertically disposed racks 43 which are engaged by pinions 44 carried by reversible vertical drive means 45 mounted within the base 40. The pinions 44 are backed up on the opposite sides of the masts 20 by rollers 44a (FIG. 5) and the vertical drive means 45 is adapted to move the vertically movable frame 14 including the upright supports 41 and 42 vertically along the masts 20 to transport a load to the different levels of the load support means 12.

The base 40 has a pair of front and rear plates 46 and 47, respectively, which are directed laterally of the carrier or transversely of the aisle 11 and are spaced from each other, in the direction of the asile, the same distance as the posts 15. Said plates 46 and 47 carry channel members 48 and 49, respectively, which said channel members are identical with the load channels 17, having their webs secured to said plates and their flanges projecting toward each other. An extractor 50 is disposed between the channel members 48 and 49 and has rollers 51 and 52 disposed respectively within said channel members for rolling engagement therewith. The extractor 50 carries a transversely disposed rack 53 therebelow which said rack is engaged by a pinion 54 on its toothed side and a backup roller 55 on its smooth side. The pinion 54 is connected to reversible extractor drive means 56 whereby the extractor 50 is drivable transversely out of the aisle 11, and the rollers 51 and 52 are movable out of the channel members 48 and 49 respectively and into a pair of opposed load channels 17 on either side of said aisle.

The extractor 50 carries a vertically movable platform 60 actuated by jacks 61 disposed at the corners of said platform. The platform is movable vertically between a position below the upper flanges of the channel members 48 and 49 and a position above said upper flanges and is capable of a corresponding movement relative to the upper flanges of a cooperating pair of load channels 17 when the extractor is disposed between said load channels. A load to be deposited at a load support means 12 is carried upon the platform 60 in the raised position whereby when the channel members 48 and 49 are aligned with a pair of load channels 17, the extractor 50 can move the load from the vertically movable frame 14 transversely into a load support means above the level of the upper flanges of the load channels 17. Subsequent lowering of the platform leaves the load bridged across the load channels whereby the extractor can retract into the vertically movable frame leaving the load in the stored position. Each load is preferably carried upon a like pallet 18 which is always adapted to bridge across a pair of cooperating load channels whereby the load 19 itself may vary as desired. To pick up a load, the extractor is first moved laterally into the load support means with the platform 60 in the lower position whereby it may be subsequently raised to lift a load from the load channels after which it is retracted back into the vertically movable frame 14.

The movement of the carrier horizontally along the aisle 11, the movement of the vertically movable frame to the different levels of the load support means, the lateral movement of the extractor 50, and the vertical movement of the platform 60 are all preferably automatically actuated in a predetermined series of sequential movements to store or retrieve a load by automatic control means of the type fully disclosed and described in my above mentioned copending application. It will be readily understood, however, that the load sensing device of this invention is applicable to any type of load storage system embodying apparatus of the same general nature disclosed herein and wherein the same general problems of safety are involved.

Figure 3:
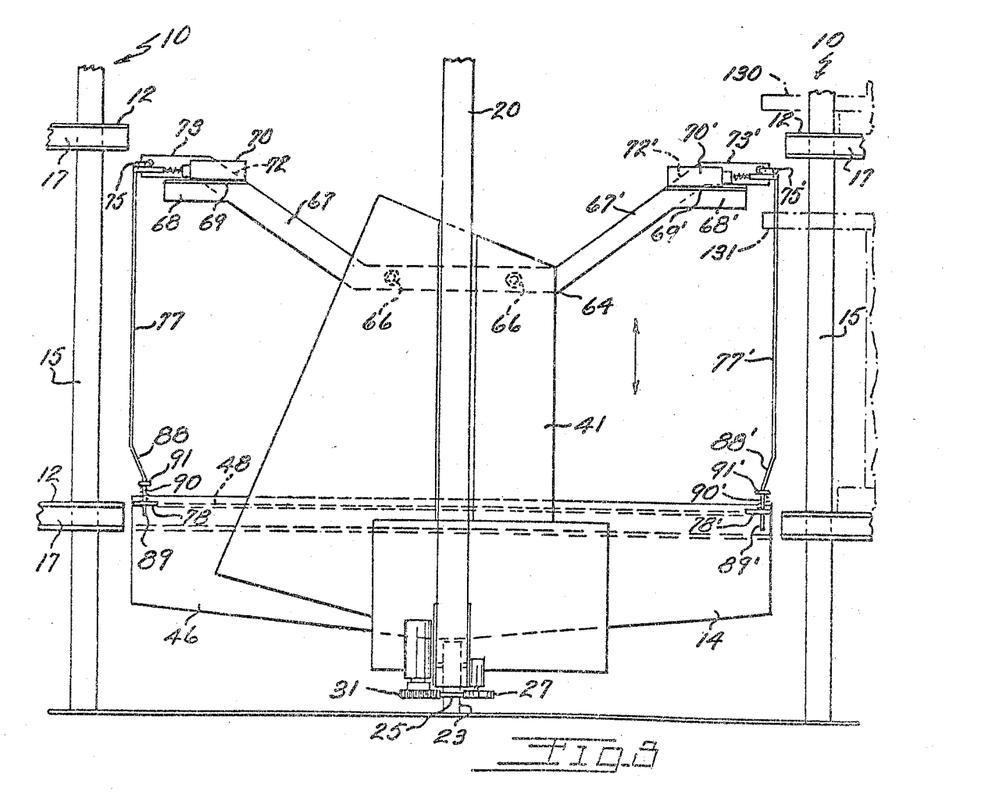
FIG. 3 is an enlarged end view of the carrier.
Figures 5, 6, 7, 8:
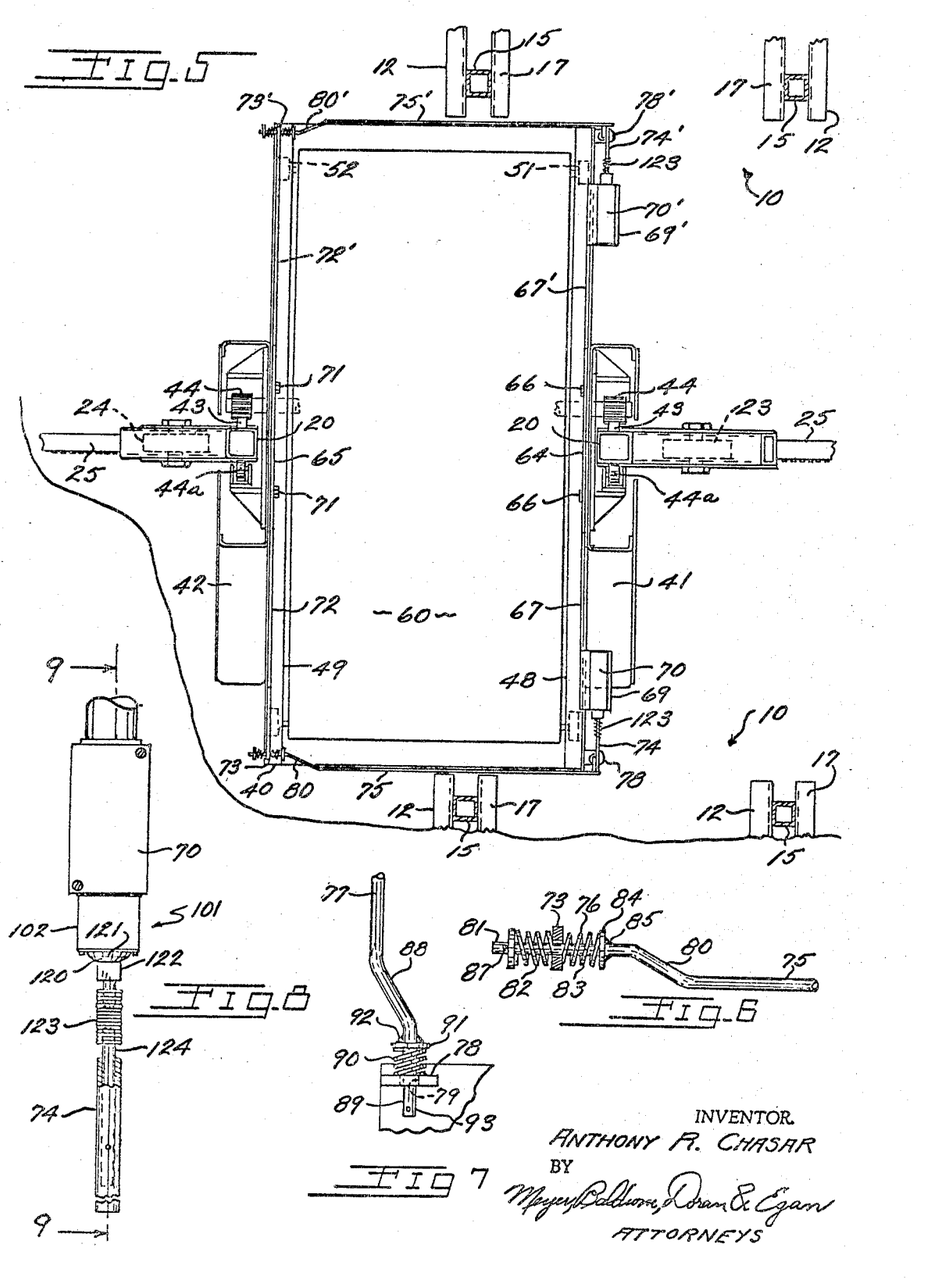
FIG. 5 is an enlarged top plan view of the carrier.
FIG. 6 is a further enlarged detail of a portion of the load sensing device as seen from the line 6—6 of FIG. 4.
FIG. 7 is an enlarged detail of a portion of the load sensing device shown in the scale of FIG. 6 and seen from the line 7—7 of FIG. 4.
FIG. 8 is an enlarged top plan view of a switch of the load sensing device.

Referring now particularly to FIGS. 3–5, the upright support 41 carries a laterally directed support 64, and the upright support 42 carries a laterally directed support 65. As well shown in FIG. 3, the support 64 is bolted to the upright support 41 by bolt and nut assemblies 66 and provides a pair of upwardly and laterally projecting arms 67 and 67′ having short, horizontal portions 68 and 68′, respectively, at their distal ends. The horizontal portions 68 and 68′ have laterally directed anges 69 and 69′, respectively, which support a pair of limit switches 70 and 70′.

The laterally directed support 65 is similar to the support 64, said support 65 being secured to the upright support 42 by nut and bolt assemblies 71 and having laterally and upwardly projecting arms 72 and 72′ having short horizontal portions 73 and 73′, respectively. It will be noted in FIG. 3, that the horizontal portions 73 and 73′ are higher than the horizontal portions 68 and 68′ whereby they are disposed substantially at the level of the limit switches 70 and 70'.

As well shown in FIG. 5, the laterally directed supports 64 and 65 are disposed forwardly and rearwardly respectively of the vertically movable platform 60 whereby a load carried by said platform normally has adequate clearance for moving therebetween when it is being transferred laterally in either direction onto or off of a load support means 12. It will be further noted that the lateral support 65 extends substantially to the lateral limits of the base 40 of the vertically movable frame 14 whereas the lateral support 64 terminates short of the lateral limits of the said base. The limit switches 70 and 70' are provided with laterally projecting operative members 74 and 74' respectively which project slightly beyond the lateral limits of said base 40.

The load sensing device of this invention according to the first embodiment comprises the limit switches 70 and 70' and angular delimiting means which are provided at the laterally directed sides of the carrier and are mirror images of each other. As well shown in FIGS. 4 and 10, a horizontally disposed rodlike actuator 75 is welded at one end thereof adjacent to the distal end of the operative member 74 with the opposite end of said actuator being telescoped through a suitable aperture 75 (FIG. 6) in the horizontal portion 73 of the laterally directed support 65. A vertically disposed actuator 77 is welded or otherwise suitably connected to the actuator 75 at its upper end closely adjacent to the distal end of the operative member 74 with the lowermost end of said actuator 77 projecting downwardly through a bracket 78 carried by the front plate 46 and suitably apertured at 79 to receive said vertical actuator. The rodlike actuators 75 and 77 as well as the operative member 74 are preferably made from steel or a similar material of substantial strength but with the actuators being somewhat flexible.

As well shown in FIGS. 5 and 6, the horizontal actuator 75 has an angled portion 80 whereby a short mounting portion 81 thereof is stepped inwardly of the aisle away from the storage frame, said mounting portion projecting through the aforementioned aperture 76 in the horizontal portion 73. A pair of coil springs 82 and 83 are telescoped over the mounting portion 81 on either side of the horizontal portion 73. The spring 83 is held against the horizontal portion 73 by a washer 84 seated upon outwardly struck lugs 85 of the mounting portion 81. The coil spring 82 is held in place by a washer 86 which is retained upon said mounting portion by a pin or cotter key 87. It will be readily seen that the horizontal actuator 75 can be moved longitudinally a short distance against the bias of the springs 82 and 83, said springs normally resiliently holding said actuator in a neutral position. Referring now to FIG. 7, the vertical actuator 77 has an inwardly angled portion 88 adjacent to its lowermost end and a short inwardly stepped, vertical mounting portion 98 which projects through the aperture 79 of the bracket 78. A coil spring 90 is telescoped over the mounting portion 89 above the bracket 78 and is retained against upward movement by a washer 91 seated against outwardly struck lugs 92 of said mounting portion 89. The vertical actuator 77 is normally held in a neutral position by the spring 90 with the normal pull of gravity biasing said actuator downwardly. Upward movement of the actuator 77 is limited by a pin or cotter key 93 adjacent to the distal end of the mounting portion 79, said actuator always tending when released to drop back to the position illustrated in FIG. 7. Said actuator 77 can also move downwardly against the bias of the coil spring 90 which, upon the actuator's release, returns said actuator to the position illustrated.

It will be understood that the opposite side of the carrier is similarly provided with a horizontal actuator 75' having an inwardly angled portion 80' and a short mounting portion 81' telescoped through a suitable aperture in the horizontal portion 73'. The horizontal actuator 75' is mounted to the horizontal portion 73' in the same manner as the actuator 75 by means of coil springs 82' and 83' and washers 84' and 86'. As shown in FIG. 3, the opposite side of the carrier also has a vertical actuator 77' having an inwardly angled portion 88' and a short mounting portion 89' which said mounting portion projects through a suitable aperture in a bracket 78' carried by the other end of the front plate 46. A coil spring 90' and a washer 91' resiliently hold the vertical actuator 77' in its neutral position in the same manner as described in connection with the vertical actuator 77.

The limit switches 70 and 70' are identical in construction, and only the switch 70 will, therefore, be described in detail. The switch contacting mechanism itself is of a conventional type having a plunger type button 100 which when pressed closes contacts within the limit switch and which when released allows said contacts to open. This type of switch is well known to those familiar with the art and is not here shown or described in detail.

Figure 9:
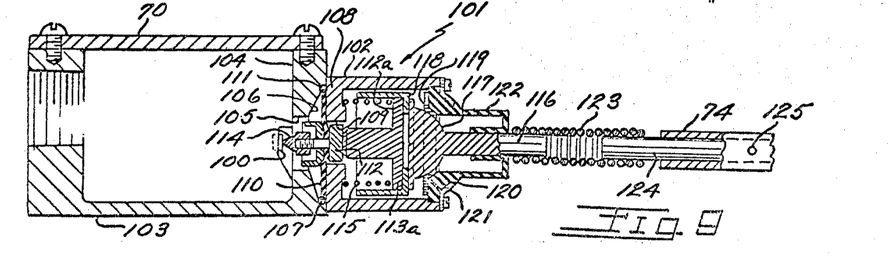
FIG. 9 is a further enlarged, longitudinal section of the switch taken along the line 9—9 of FIG. 8.

Referring now to FIG. 9 of the drawings, the limit switch 70 has a wobble stick type actuating mechanism for depressing the button 100, said actuating mechanism being generally indicated at 101. Said actuating mechanism is partially encased in a housing 102 which is secured to a wall 104 of a housing 103 of the limit switch 70. Said wall 104 has a cylindrical aperture 105 therein which is flared toward the outer side thereof to afford a frusto-conical portion 106. An annular recess 107 is provided at the outer edge of the frusto-conical portion at the outer surface of the wall 104. The housing 102 has a wall 108 disposed against the wall 104 and over the frusto-conical portion 106, said wall 108 being apertured coaxially with the aperture 105 as indicated at 109. A flexible diaphragm 110 is disposed across the mouth of the frusto-conical portion 106 and has a bead 111 at its periphery which is disposed in the annular recess 107. The diaphragm 110 is suitably secured in the center thereof to a stem 112 having a disklike head 112a seated against an inturned flange 113a of a hollow piston 113. Said piston is carried within the housing 102, and conical contact member 114 is carried at the end of the stem 112 and projects through the aperture 105 in the wall 104 in contact with the button 100. A coil spring 115 is disposed within the piston 113 around the stem 112 and bears against the wall 108 in one direction and the head 112a in the other direction thereby biasing said piston and the contact member 114 away from the button 100. Axial movement of the cylinder 113 in the direction of the limit switch housing 103 causes the contact member 114 to actuate the button 100 thereby tripping the limit switch 70.

Means for moving the piston 113 to actuate the limit switch 70 comprises a rod 116 having a semispherical base 117 at one end thereof which said base bears against the flange 113a of the piston 113. The base 117 has an annular, radiating flange 118 and is pivotable in a seat 119. The seat 119 is held against the semispherical base 117 by a flexible cap 120 secured to the housing 102 by an annular retainer 121. The cap 120 has a tubular extension 122 which fits closely around the rod 116 and is made of such resilient material as to allow pivoting or wobbling of said rod in any direction radiating from the axis thereof. It will be readily apparent that when the rod 116 is pivoted thereby causing the base 117 to turn in the seat 119, the annular flange 118 bears against the piston 113 and moves said piston in the direction of the limit switch housing 103 with the result that the limit switch 70 is actuated. It will further be understood that if the rod 116 is moved axially in the direction of the limit switch housing 103, the piston 113 will likewise be moved and the limit switch 70 will be actuated.

A heavy coil spring 123, having closed coils so that it provides no compressive resilience along its axis, is tightly telescoped at one end thereof over the rod 116 and at the other end thereof over a rod 124 of like dimension. The operative member 74 is tubular in form and is telescoped over the rod 124 and secured thereto by a pin 125.

From the foregoing it will be seen that the limit switch 70 is actuated whenever the operative member 74 is moved in any direction except outwardly from the housing 102 of the actuating mechanism 101 in the direction of its own axis. Straight outward movement of said operative member has no effect on the limit switch 70 because it would serve only to allow the piston 113 and the contact member 114 to move away from the button 109, but movement in any other direction whether straight in toward the limit switch or pivoting laterally thereof causes axial movement of the piston 113 and actuation of the limit switch 70.

The limit switches 70 and 70′ are connected into the control system for operating the carrier in such manner that actuation of either of said switches will cut off all power to the carrier and cause it to stop. Assuming that the storage apparatus herein disclosed is provided with automatic control means of the general type disclosed in the aforementioned copending application, the switches 70 and 70′ are adapted, upon actuation thereof, to break the circuit in a main power lead or isolate a master control relay or in some other manner well known to those familiar with electrical control art cut off the current to the carrier power means.

The function of the actuators 75 and 77 is to transmit any force applied to one of them to the limit switch 70 thereby tripping said limit switch and causing the carrier to stop. As well shown in FIG. 4, the vertically disposed actuator 77 is disposed generally on the lead or forward side of the carrier just forwardly of the load 19. The horizontally disposed actuator 75 is disposed in the same plane as the actuator 77 just above the level of the load and, as well shown in FIG. 3, a safe distance below the load channels 17 of a load support 12 positioned just above a load support means at which the carrier is delivering or retrieving a load. When the carrier 14 initially picks up a load at a suitable pick-up station (not illustrated) having load support means similar to that shown at 12, the load must be low enough to pass under the horizontally disposed actuator 75 or said horizontally disposed actuator will be struck and the carrier operation will stop. Therefore, one feature of the load sensing device of this invention is to prevent the carrier from initially taking on a load which is too high to be safely stored in the storage frame 10. If an oversized load does strike the actuator 75, the result is a pressure on said actuator in the direction indicated by the arrow A in FIG. 10 and this causes endwise movement of the operative member 74 in the direction of the limit switch 70 and actuates said limit switch in the manner hereinabove described.

Figure 10:
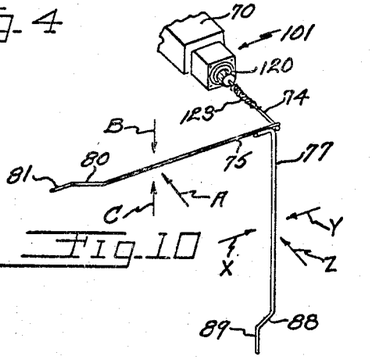
FIG. 10 is a perspective view of the first embodiment of a load sensing device of this invention.

Referring now to FIG. 3, if the carrier is moving upwardly and a portion of a load is projecting from the storage frame into the aisle as indicated by broken lines at 130 whereby it would be struck either by a load on the carrier or by the vertically movable frame 14 itself, said projecting load 130 will first strike the actuator 75 in the direction indicated by the arrow B in FIG. 10 thereby causing said actuator 75 to move downwardly and pivot the operative member 74 with the result that the limit switch 70 is actuated. The actuator 75 is free to move downwardly at the end thereof which is connected to the operative member 74 because the aperture 76 (FIG. 6) is sufficiently large to allow tilting of said actuator 75 and because the vertical actuator 77 can move downwardly against the bias of the coil spring 90 (FIG. 7). Thus, the carrier is stopped before collision damage occurs.

If in depositing a load a portion thereof becomes disarranged and projects outwardly into the aisle as indicated by broken lines at 131 in FIG. 3, subsequent downward movement of the vertically movable carriage 14 will cause said load to strike the actuator 75 from the direction indicated by the arrow C in FIG. 10 whereby said actuator is pivoted upwardly, the operative member 74 is likewise pivoted upwardly, and the limit switch 70 is actuated. Upward movement of the actuator 75 is possible because the vertically disposed actuator 77 is allowed upward vertical movement a sufficient distance to actuate the limit switch 70 before the pin 93 strikes the bottom of the bracket 78 (FIG. 7). Thus, the carrier is stopped before it can move away from the projecting load portion 131 and the operator's attention is drawn to the misplaced load.

If the projecting load portion 131 is disposed at the lowermost level of the load supports 12 whereby no substantial vertical movement of the vertically movable carriage 14 is effected before said carriage moves rearwardly back to a reference or starting position, said load portion 131 will strike the vertically disposed actuator 77 in the direction indicated by the arrow X thereby tilting it and causing actuation of the switch 70. This tilting motion of the actuator 77 is possible due to the fact that the aperture 79 in the bracket 78 (FIG. 7) is slightly oversize to allow this tilting motion and because the horizontal actuator 75 is movable longitudinally against the coil spring 82 (FIG. 6).

If during horizontal forward motion of the carrier, the vertical actuator 77 is struck by a projecting load portion such as that shown at either 130 or 131, said vertically disposed actuator will be tilted by a pressure from the direction indicated by the arrow Y in FIG. 10 thereby moving the horizontally disposed actuator 75 longitudinally against the coil spring 83 resulting in a pivoting of the operative member 74 and actuation of the limit switch 70. The arrow Z in FIG. 10 indicates the manner in which the limit switch 70 would be actuated by a load which is moving onto the carrier but which projects an excessive distance in a forward direction rather than upwardly.

It will be understood that the load sensing device on the opposite side of the carrier indicated by the primed reference numerals works in exactly the same way as that just described. It will be further noted that in an emergency, an operator who is within reach of either of the actuators 75 or 77 can stop the carrier motion by manually grasping or striking one of said actuators.

As shown in FIG. 3, the lateral clearance at the side of the carrige between the vertically movable frame 14 and the load support means 12 is quite small. The actuators 75 and 77 are disposed in a plane preferably just beyond the side of the vertically movable frame 14 and define horizontal and vertical edges of a planar area of safety within this running clearance of the carrier. As the carrier moves, the actuators sweep across the plane defined by the open ends of the load support means on either side of the carrier whereby they detect and react to any misplaced or projecting load which extends into the clearance area.

Figure 11:
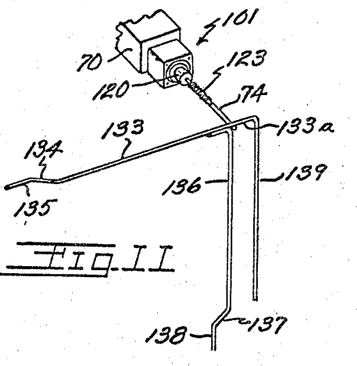
FIG. 11 is a view similar to FIG. 10 showing a modification of said first embodiment.

FIG. 11 shows a modified form of the arrangement of actuators of the type shown at 75 and 77 in FIG. 10. In FIG. 11, the actuator arrangement is adapted to trip the limit switch 70 having an operative member 74 and comprises a rodlike horizontal actuator 133 which has an angled portion 134, like the angled portion 80 of the first embodiment, and a short mounting portion 135 which is similar to the mounting portion 81 of said first embodiment. A vertically disposed actuator 136 is connected at its upper end in any suitable manner such as by welding to the horizontal actuator 133, both said actuators being connected adjacent to the distal end of the operative member 74. The lower end of the vertical actuator 136 has an angled portion 137, similar to the angled portion 88 of the first embodiment, and a short mounting portion 138 which is similar to the mounting portion 89 of said first embodiment. It will be understood that the mounting portions 135 and 138 are adapted to be mounted to a horizontal portion 73 and a bracket 78 respectively in exactly the same manner as illustrated in FIGS. 6 and 7 in connection with the first embodiment.

The modification of FIG. 11 comprises an extension of the horizontal actuator 133 whereby it projects forwardly beyond the operative member 74 as indicated at 133a and then has a depending, vertically disposed, auxiliary portion 139 bent downwardly at right angles to the extension portion 133a and disposed parallel with the vertical actuator 136. The modification at 133a and 139 extends the effectiveness of the vertical actuator 136 in a forward direction whereby when the carrier is traveling forwardly and strikes an outwardly projecting object, it is stopped sooner than it ordinarily would be. Such modification is preferable where the vertically movable frame or any part of the carrier extends forwardly of the limit switches 70 and 70' whereby they can be struck before the load sensing device can be actuated. The modification of FIG. 11 also allows the position of a limit switch to be varied with respect to the vertical actuator, where the construction of individual carriers or storage apparatus so warrants, without sacrificing complete protection of the carrier.

Figure 12:
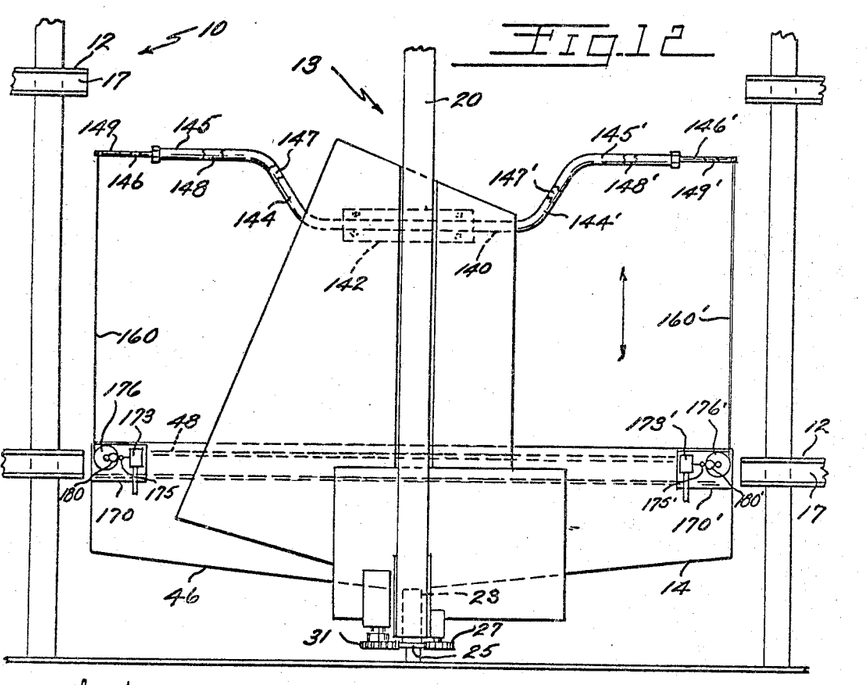
FIG. 12 is an end view similar to FIG. 3 of the carrier having mounted thereto the load sensing device according to a second embodiment thereof.

The second embodiment of the load sensing device of this invention as illustrated in FIGS. 12–18 is shown mounted to and in conjunction with a carrier 13 and a storage frame 10 which are identical with those shown in the first embodiment and which will be referred to by the same reference numerals. Referring now to FIGS. 12 and 13, laterally directed supports 140 and 141 are secured to the upright supports 41 and 42 respectively at the inner surfaces thereof by brackets 142 and 143. The support 140 is provided with laterally and upwardly angled arms 144 and 144' and straight, horizontal, distal end portions 145 and 145'. Said support 140 is preferably made from steel tubular material, and the distal end portions 145 and 145' carry laterally oppositely projecting rods 146 and 146' telescopically mounted into said distal end portions in a manner to be hereinlater fully described. The laterally directed support 141 is similarly provided with laterally and upwardly projecting arms 147 and 147' having straight distal end portions 148 and 148' which carry telescoping rods 149 and 149'. The laterally directed supports 140 and 141 are identical in configuration, with the support 141 being directly behind and in line with the support 140 and FIG. 12. Portions of the support 141 are, therefore, shown by breaking away small portions of the support 140 in said FIG. 12.

The telescoping rods 146, 146', 149 and 149' are all mounted to the distal end portions in the same manner and only the rod 146 will, therefore, be described in detail. Said rod 146 and the mounting therefor is detailed in FIG. 17 wherein a hollow bolt 150 is thread fitted into the end of the distal end portion 145 and is provided with an axial bore 151 adapted to slidably receive the rod 146. The inwardly directed end of the rod 146 has a diametrically reduced, threaded portion 152 having a nut 153 thread fitted thereon to limit the axial outward movement of said telescoping rod. A pin 154 is disposed diametrically through the distal end portion 145 inwardly of the nut 153 and riveted to said distal end portion to provide a barrier within the hollow, tubular member. A coil spring 155 is slidably disposed within the distal end portion 145 compressively between the pin 154 and the nut 153 carried by the telescoping rod 146. The spring 155 biases the rod outwardly to the full line position illustrated but upon axial end pressure to said rod, allows the rod to move inwardly thereby further compressing the spring 155. Adjacent to the distal end of the rod 146 there is provided a circumferential groove 156 which opens outwardly from the outer peripheral surface of said rod. All of the rods 146, 146', 149, and 149' are similarly grooved.

Referring now to FIG. 13, the actuator for the load sensing device of the second embodiment comprises a flexible cable 160 which is connected at one end thereof to the rear plate 47 of the vertically movable frame 14 by any suitable means such as a bolt 161. Said cable extends upwardly over the telescoping rod 146 within the groove 156 thereof, horizontally across to the telescoping rod 149 and the aforementioned groove therein, and downwardly to a switch assembly 170 which is mounted to the outer surface of the front plate 46. The opposite side of the carrier and the telescoping rods 146' and 149' similarly mount a flexible cable 160' being attached at the forward end of the carrier to a switch assembly 170'.

Figure 14:
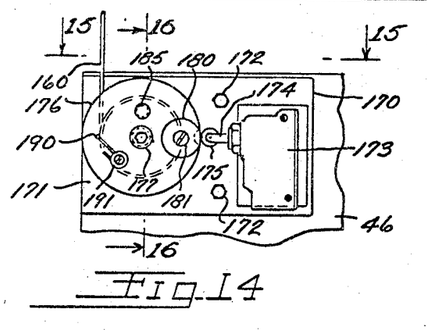
FIG. 14 is a side elevation of the switch assembly of the second embodiment.
Figure 15:
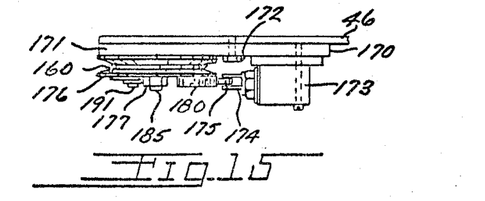
FIG. 15 is a top plan view of the switch assembly of FIG. 14 as seen from the line 15—15 of FIG. 14.
Figure 16:
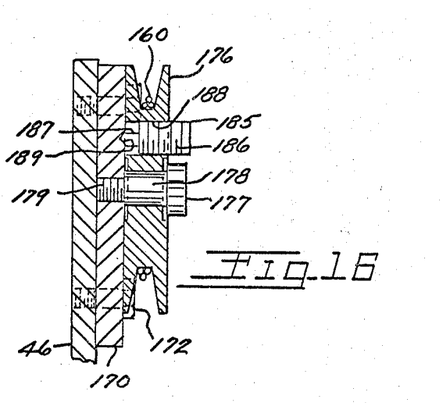
FIG. 16 is a vertical section taken along the line 16—16 of FIG. 14.
Figures 17, 18:
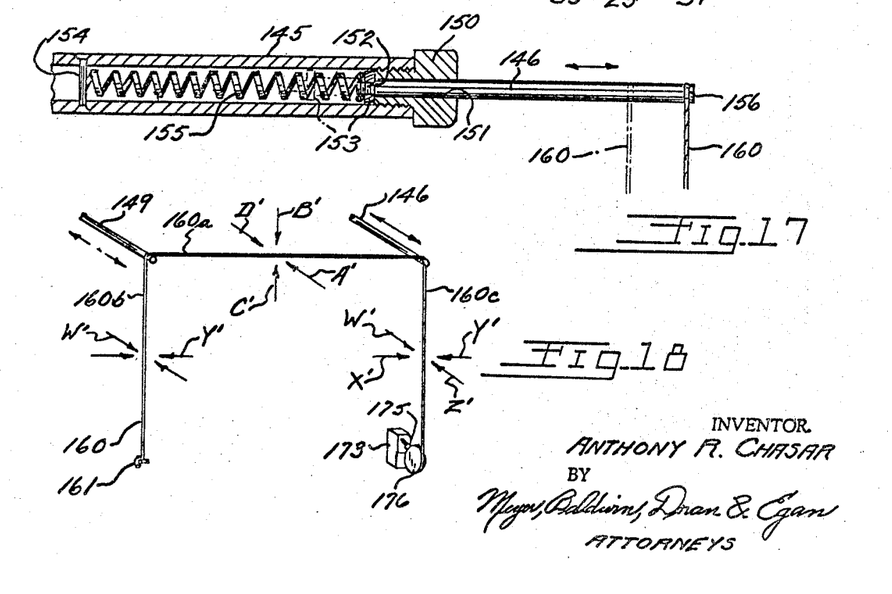
FIG. 17 is an enlarged, longitudinal section taken along the line 17—17 of FIG. 13.
FIG. 18 is a schematic perspective view of the load sensing device of the second embodiment of the invention.

The switch assemblies 170 and 170' are identical in construction, and only the switch assembly 170 is, therefore, described in detail and illustrated in FIGS. 14–16. Said switch assembly comprises a base plate 171 which is secured to the front plate 46 in any suitable manner such as by bolts 172. A limit switch 173 is mounted to the base plate 171 adjacent to one end thereof and has a plunger type, outwardly biased actuator 174 carrying a roller 175 at the distal end thereof and which said actuator is directed horizontally toward the opposite end of said base plate.

A pulley wheel 176 is rotatably mounted upon a shouldered nut 177 having a smooth shank portion 178 for receiving said pulley wheel and a diametrically reduced, threaded portion 179 thread fitted within a suitable aperture of the base plate 171. The outer side surface of the pulley wheel 176 carries a circular cam 180 the axis of which is radially displaced from the axis of the pulley wheel 176. The cam 180 is secured to said pulley wheel by a bolt 181 and is adapted to travel in a circle around the axis of the pulley wheel whenever said pulley wheel is rotated. In its normal position, the cam 180 is disposed exactly opposite to the roller 175 of the limit switch actuator 174, and in such position it contacts the roller 175 and cams the actuator 174 inwardly. Rotation of the cam around the axis of the pulley away from the roller 175 allows the actuator 174 to move outwardly whereby the limit switch 173 returns to its normal position. The contacts of the limit switch are such that in its normal position it cuts off power to the carrier in a suitable manner such as was suggested in connection with the first embodiment whereby the carrier will stop. With the cam 180 in the position illustrated in FIG. 14, the contacts of the limit switch 173 are held in the position opposite to the cutoff position whereby the carrier can operate normally.

A detent mechanism 185 is mounted to the pulley wheel 176 to hold said pulley wheel in the position illustrated in FIG. 14. Said detent mechanism comprises a threaded cartridge 186 thread fitted into an aperture 188 extending through the pulley wheel 176 and carrying a spring biased detent 187. The detent 187 is directed toward the base plate 171, and said base plate is provided with a dimple 189 adapted to receive the distal end of the detent 187. The dimple 189 is so positioned that the detent 187 is seated therein when the pulley wheel and cam 180 are in the position shown in FIG. 14. Said detent and dimple create sufficient resistance to the turning of the pulley wheel 176 that the natural tendency for the cam 180 to roll away from the roller 175 is inhibited. In this position, the cable 160 is pulled tautly across the rods 146 and 149 with the end thereof being wound around and secured to the pulley wheel 176. In the form of the invention shown, the cable 160 projects through an aperture 190 in one flange of the pulley wheel 176 and is secured to the outside of said pulley wheel by a screw 191.

In the second embodiment of the invention, the cables 160 and 160' form inverted, U-shape barriers defining planes which are disposed adjacent to the clearance areas on either side of the carrier. If an object projects into the aisle beyond this clearance area, the cable will be struck and pulled whereby it will cause rotation of the pulley wheel 176 and movement of the cam 180 away from the roller 175 of the limit switch 173. Slight rotation of the pulley wheel 176 will cause the detent 187 to move out of the dimple 189, and when this happens, the cam 180 will automatically be moved away from the roller 175 by the plunger 174 because said roller and said cam make only point, peripheral contact and even slight misalignment between the plunger axis and the cam axis will cause the outwardly biased plunger to move the cam to one side. The cables can be struck by outwardly projecting objects when the carrier is moving either forwardly or rearwardly or when it is moving vertically upwardly or downwardly. The horizontal portion of the cable 160 as shown at 160a in FIG. 18 will prevent the carrier from moving upwardly into a projecting load or from moving downwardly away from a projecting load which has just been deposited by the carrier. The vertical portions of the cable as shown at 160b and 160c will cause the switch 173 to be actuated when the carrier is moving horizontally toward a projecting load in either horizontal direction or when the carrier starts to move horizontally away from a disarranged and projecting load which the carrier has just deposited.

If the operator attempts to take on an oversized load at a start or pick-up station, the load will strike some portion of the cable 160 thereby tripping the limit switch 173 and stopping the movement of the carrier. If the load should happen to hit one of the telescoping rods 146, 146', 149 or 149', said rod will telescope inwardly of the associated distal end portion thereby pulling on the cable and actuating the limit switch 173. If a load of proper size which is already on the carrier becomes skewed and strikes the cable as it is moving off of the vertically movable frame and into a load support means 12, this will also cause tripping of the limit switch 173 and stopping of all movement of the carrier. Thus, it will be seen that the horizontal portion 160a will cause tripping of the limit switch if it is struck from any of the directions indicated by the arrows A', B', C' and D' whereas the vertical cable portions 160b and 160c will similarly effect a response in the limit switch if struck from any of the directions indicated by the arrows X', Y', Z', or W'. As in the first embodiment of the invention, the actuator or cable 160 can be operated by hand by an operator who is within reach of the cable by pulling on any part of it in any direction.

Figure 19:
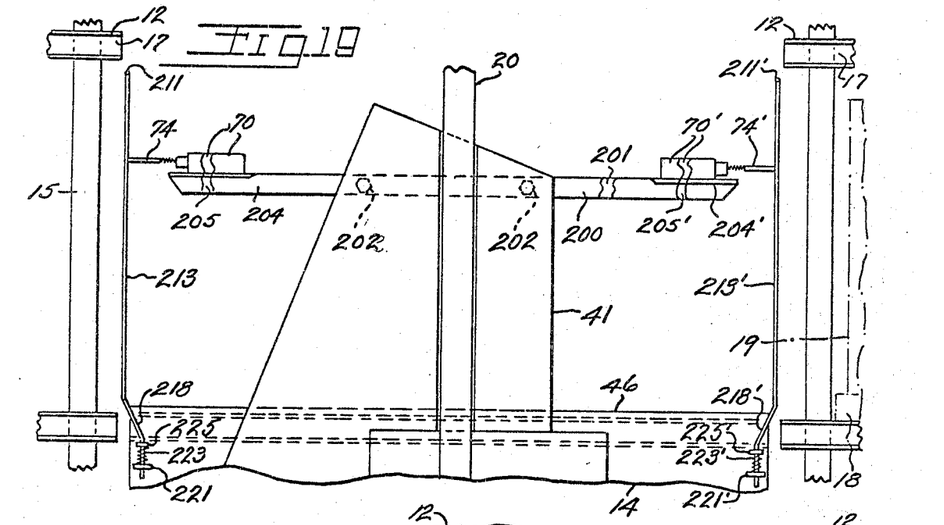
FIG. 19 is an end view of the carrier similar to FIGS. 3 and 12 with a portion of the carrier being cut away, said carrier having mounted thereto the load sensing device according to a third embodiment thereof.
Figure 20:
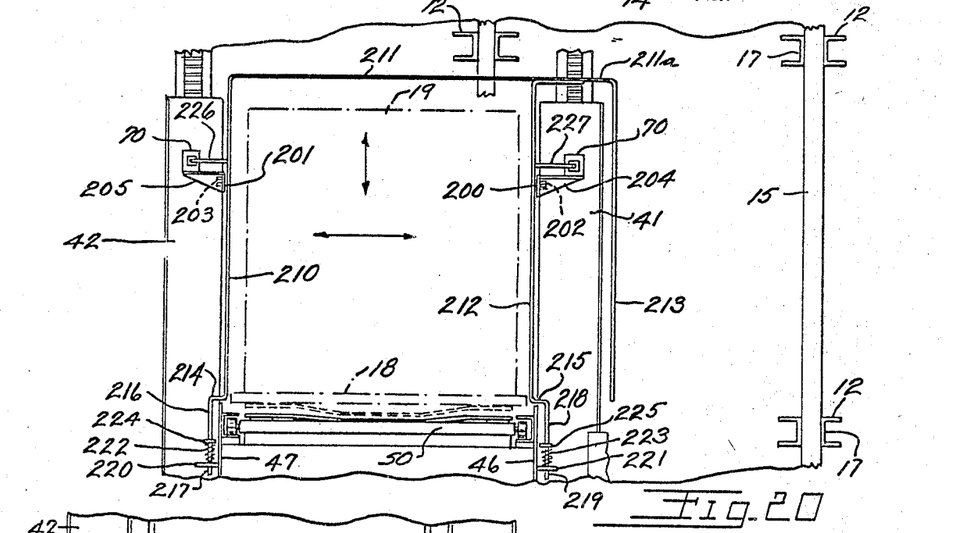
FIG. 20 is a side view of the carrier and load sensing device of FIG. 19 with a portion of the carrier being cut away.
Figure 21:
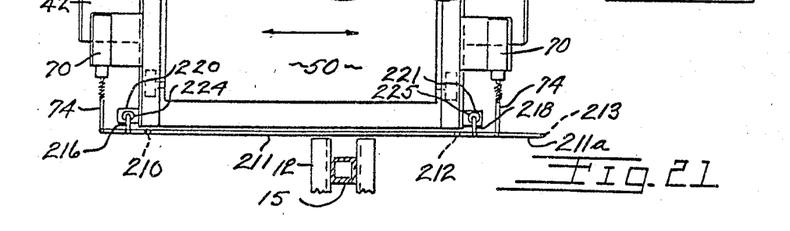
FIG. 21 is a fragmentary top plan view of the carrier and load sensing device of FIGS. 19 and 20.

The third embodiment of the invention is illustrated in FIGS. 19–21 and comprises a load sensing device mounted upon a vertically movable frame 14 which said frame is identical with that shown in the first two embodiments of the invention and the parts of which will be referred to by the same reference numerals. As well shown in FIGS. 19 and 20, laterally and horizontally disposed supports 200 and 201 are secured to the upright supports 41 and 42 respectively by suitable means such as nut and bolt assemblies 202 and 203. The distal end portions of the lateral support 200 are provided with horizontally disposed brackets 204 and 204' which project outwardly from said lateral support at the side thereof which is adjacent to the upright support 41. The lateral support 201 is similarly provided at the distal end portions thereof with outwardly projecting brackets 205 and 205' which project from the side of said support 201 which is adjacent to the upright support 42. The brackets 204 and 205 support a pair of limit switches 70 and the brackets 204' and 205' support a pair of like limit switches 70'. As shown in FIG. 20, the limit switches 70 are positioned in a forward and rearward direction outside of the load space defined between the upright supports 41 and 42, and it will be understood that the switches 70' are similarly positioned at the opposite side of the carrier. It will be further noted that said limit switches 70 (and 70') are disposed at a vertical level which is substantially below the upper limits of the load space rather than adjacent to the upper corners thereof as is in the first embodiment of the invention.

The third embodiment differs from the first embodiment in that it provides an inverted, U-shaped actuating frame disposed in the running clearance space at each side of the carrier 13 which said U-shaped frame defines the limits at the forwardly and rearwardly directed sides and at the top of a permissible load to be carried by the carrier. As illustrated in FIG. 20, a vertically disposed, rodlike actuator 210 is disposed just forwardly of the upright support 42 to define the limits of the rearwardly directed side of the load, said rodlike actuator being bent at right angles at its upper end to afford a horizontally disposed actuator 211 which defines the permissible height of the load. A second, vertically disposed actuator 212 is disposed just rearwardly of the upright support 41 to define the limits of the forwardly directed side of the load, the upper end of said actuator 212 being suitably secured to the horizontal actuator 211. The actuator 211 has a forwardly projecting extension 211a which is bent downwardly to provide a vertically disposed auxiliary portion 213 which functions in the same manner as the auxiliary portion 139 in the modification of FIG. 11.

The vertical actuator 210 has a right angularly bent step 214 adjacent to its lower end which extends in a rearward direction rearwardly beyond and over the rear plate 47. In a similar manner, the vertical actuator 212 is right angularly bent in a forward direction adjacent to its lower end to afford a step 215 extending forwardly beyond and over the front plate 46. As shown in FIGS. 19 and 21, an inwardly angled portion 216 is provided below the step 214 of the actuator 210 whereby it disposes a vertical mounting portion 217 inwardly of the adjacent clearance space between the carrier and the storage frame. In the same manner, an inwardly angled portion 218 is provided below the step 215 of the actuator 212 to dispose a lowermost mounting portion 219 inwardly of said clearance space.

The mounting portions 217 and 219 are mounted to the plates 47 and 46 respectively in the same manner as that disclosed in FIG. 7 by laterally projecting brackets 220 and 221. Coil springs 222 and 223 telescoped over the mounting portions 217 and 219 respectively and retained by washers 224 and 225 afford vertical movement and resilient positioning of the vertical actuators 210 and 212 in the manner described in connection with the vertical actuator 77 of the first embodiment. The limit switches 70 are secured to the vertical actuators 210 and 212 at intermediate portions thereof by horizontal connectors 226 and 227. Each connector comprises an elongated metal rod which is welded or otherwise suitably secured at one end to an operative member 74 and at the other end to one of the vertical actuators.

It will be understood that the opposite side of the carrier 13 is provided with an inverted, U-shaped actuator frame arrangement as just described, the parts thereof which shown in FIG. 19 being indicated by like, primed numbers.

In the third embodiment of the invention, the limit switches 70 and 70' are connected in series with the electrical control system whereby if any one of them is tripped by an object striking or pressing against any of the actuators, the carrier and/or the extractor automatically stops. It will be readily seen that actuation of one of the switches 70 in FIG. 20 is effected in the same manner as hereinbefore described in connection with FIGS. 10 and 11 either by one of the actuators striking a protruding load or by one of said actuators being struck by an oversized or skewed load moving onto the carrier. The arrangement of the third embodiment adds the feature of sensing both sides of the load as well as the height thereof because the vertical actuators 210 and 212 are disposed inwardly of the adjacent upright supports 42 and 41 respectively. Thus, if the pallet 18 or the load 19 is skewed upon entering or being moved onto the vertically movable frame or if an oversized load is moved toward the carrier, one of the vertical actuators 210 and 212 is struck, thereby actuating a limit switch 70 through a connector 226 or 227 and stopping the extractor before the skewed or oversized load can be stored.

The fourth embodiment of the invention is illustrated in FIGS. 22–28 and comprises a load sensing device mounted upon carrier 233 having a modified but basically similar vertically movable frame 234 which said frame 234 is is vertically and horizontally movable in the same manner as the frame 14 in the first three embodiments of the invention. Said vertically movable frame 234 is movable along vertical masts 235 by any suitable drive means and is guided therealong by wheels 236. It will be understood that the vertical masts 235 are movable horizontally along the aisle 11 and carry the vertically movable frame 234 therewith in the same manner as in the previous embodiments of the invention.

Figure 22:
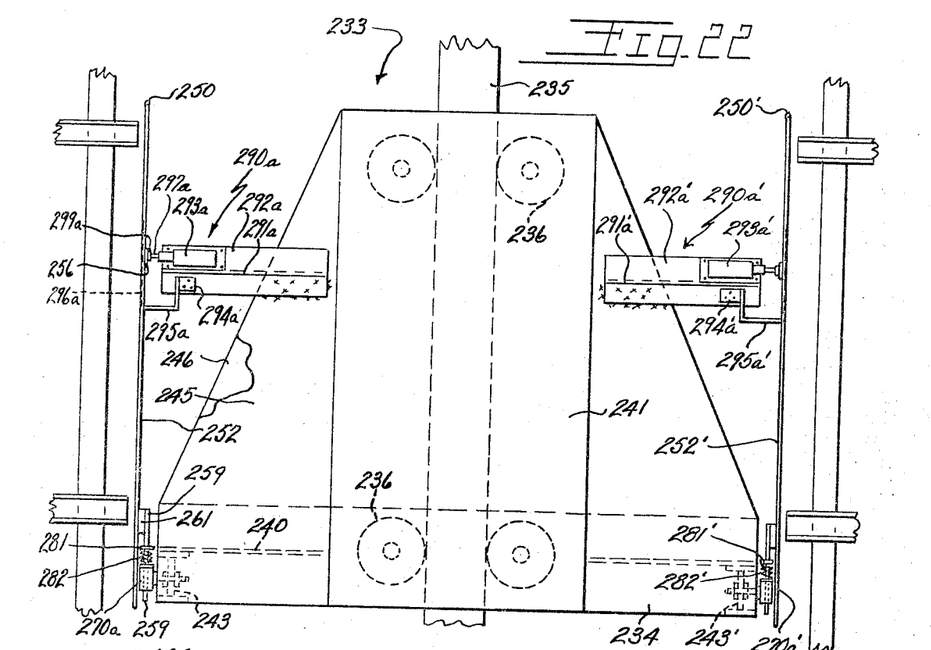
FIG. 22 is an end view of a carrier of the general type shown in FIGS. 3, 12, and 19, said carrier having mounted thereto the load sensing device according to a fourth embodiment thereof.
Figure 23:
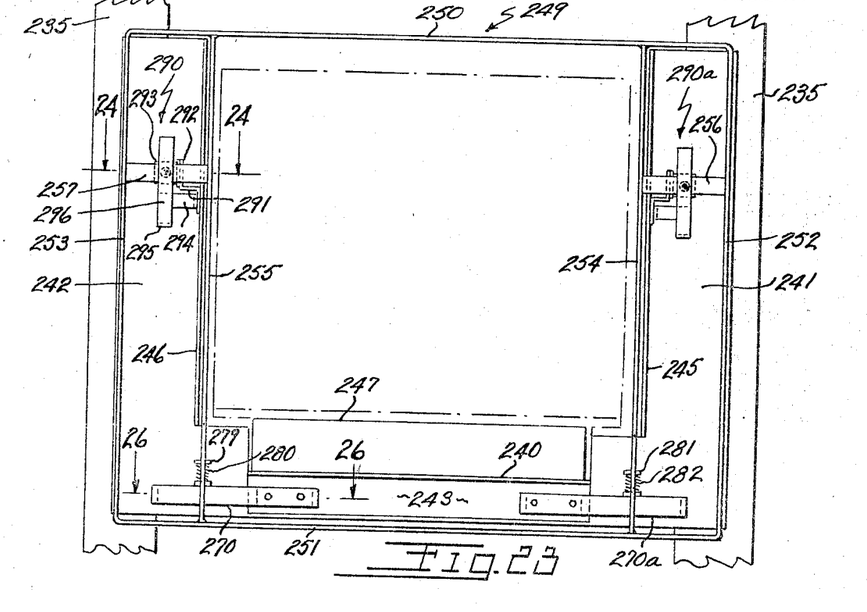
FIG. 23 is a side view of the carrier and load sensing device of FIG. 22.

The vertically movable frame 234 comprises a base 240 connected between a front upright support 241 and a rear upright support 242. The upright supports house the wheels 236 and other suitable drive and guide means for vertically propelling the vertically movable frame 234 and are connected across their lateral edges, beneath the base 240, by I-beams 243 and 243'. The upright supports 241 and 242 include upwardly tapering side plates 245 and 246, as best seen in FIG. 22, which said side plates define the load carrying area of the vertically movable frame 234. As best shown in FIG. 23, the base 240 is recessed somewhat and carries an extractor mechanism 247 which is merely shown as a rectangle and which will be understood to embody mechanism of the type shown in FIG. 4 and described in connection therewith.

As in the first three embodiments of the invention, the load sensing apparatus at either lateral side of the vertically movable frame is a mirror image of that on the opposite side of the frame and, therefore, only the mechanism mounted adjacent to and in connection with the I-beam 243 will be described in detail. Similar parts shown in FIG. 22 on the opposite side of the machine are indicated by like reference numerals primed.

Figures 27, 28:
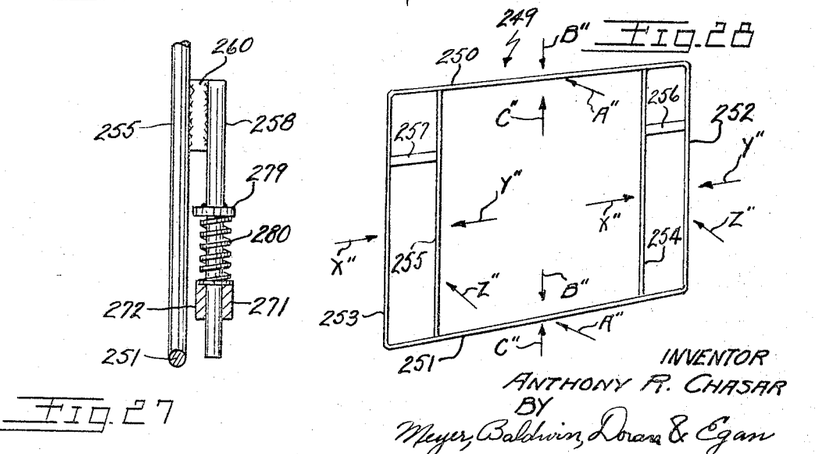
FIG. 27 is a section taken along the line 27—27 of FIG. 26.
FIG. 28 is a schematic perspective view of the load sensing device of the fourth embodiment of the invention.

The actuator means of the fourth embodiment of the invention, as clearly shown in FIGS. 23 and 28, differs from the third embodiment in that the actuators thereof define a rectangular rigid frame 249 at the side of the carrier which frame is mounted to the vertically movable frame for floating action of frame 249 in its own plane after it strikes an object. The actuator means of the fourth embodiment comprises upper and lower, spaced horizontal actuators 250 and 251, respectively, which are joined at the ends by front and rear, vertical actuators 252 and 253, respectively. The actuators 250–253 comprise a rectangle which extends horizontally from substantially the forward edge or limit of the front upright support 241 to the rearward edge or limit of the rear upright support 242. The upper horizontal actuator 250 is disposed just above the upper ends of the upright supports, and the lower horizontal actuator 251 is disposed just below the level of the I-beams 243. Intermediate, vertical actuators 254 and 255 connect the horizontal actuators 250 and 251 inwardly from the vertical actuators 252 and 253, respectively. The intermediate vertical actuator 254 is disposed slightly rearwardly of the front upright support 241, and the intermediate vertical actuator 255 is disposed just forwardly of the rear upright support 242. As best shown in FIG. 23, it will be seen that the intermediate actuators 254 and 255 define the allowable width of a load moving laterally onto or off of the carrier whereas the horizontal, upper actuator 250 defines the maximum permissible height of said load.

The actuators 250–255, as herein illustrated, comprise elongated, metal bars which are welded together to form the actuator frame 249 as described. As best shown in FIG. 23, the frame also includes a pair of mounting plates or bars 256 and 257 which are disposed horizontally between the pairs of vertical actuators 252–254 and 253–255, respectively. The mounting bars 256 and 257 are welded at the ends thereof to their respective pairs of vertical actuators on the inside of the frame toward the vertically movable frame 234 and are disposed about one-third of the way down from the horizontal actuator 250 relative to the vertical dimension of the frame. A pair of mounting pins 258 and 259 are mounted adjacent to the lower ends of the intermediate, vertical actuators 254 and 255, said mounting pins being spaced inwardly of and behind said intermediate, vertical bars by spacers 260 and 261, respectively. The mounting pins 258 and 259 are disposed vertically, parallel with the intermediate actuators and are welded or otherwise suitably attached at their upper ends to the spacers 260 and 261 which are, in turn, welded or otherwise suitably attached to the intermediate actuators. Thus, as best shown in FIG. 22, said mounting pins project downwardly from the spacers with the lowermost ends of said pins terminating slightly above the lower horizontal actuator 251.

The lower end of the actuator frame 249 is supported by a pair of support weldments 270 and 270a which are carried by the I-beam 243. The support weldments 270 and 270a are mirror images of each other, and only the support weldment 270 and parts associated therewith will be described in detail, it being understood that the weldment 270a comprises the same parts oppositely arranged.

Figures 24, 25, 26:
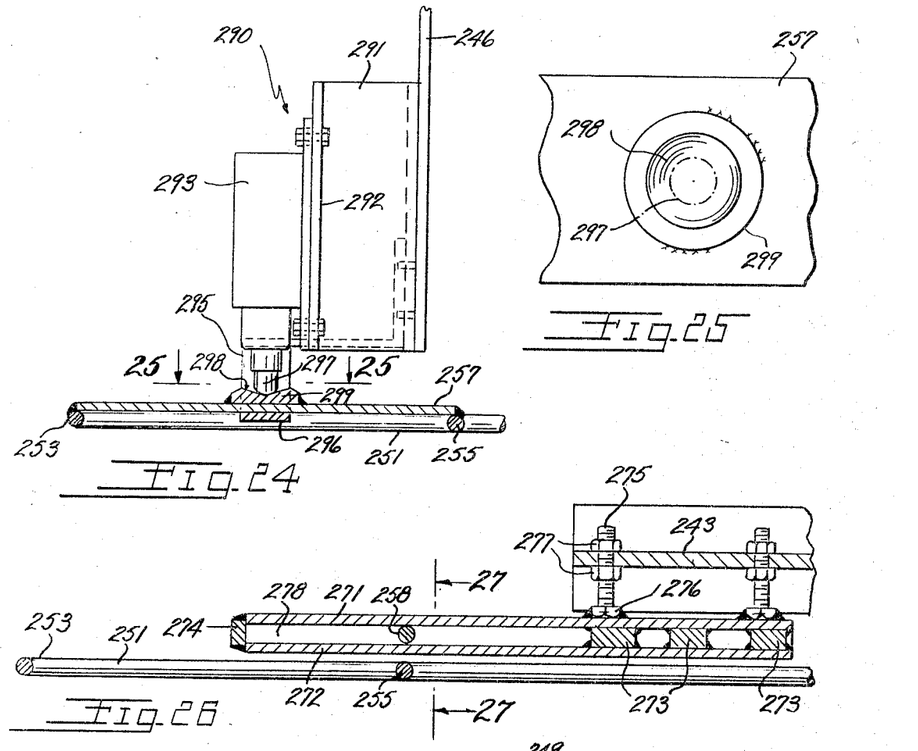
FIG. 24 is an enlarged section taken along the line 24—24 of FIG. 23.
FIG. 25 is further enlarged, detailed view of a portion of the load sensing device as seen from the line 25—25 of FIG. 24.
FIG. 26 is an enlarged section taken along the line 26—26 of FIG. 23.

The support weldment 270 is detailed in FIGS. 26 and 27 and comprises a pair of elongated, flat bars 271 and 272 which are rigidly maintained in parallel, spaced relation by spacer blocks 273 disposed therebetween and an end member 274. The bars, spacer blocks, and end member are welded together with said spacer blocks being clustered adjacent to one end of said bars. Said one end carries a pair of bolts 275 having their heads 276 welded to the bar 271 and projecting perpendicular thereto. The bolts 275 project through suitable apertures in the web of the I-beam 243 and are each secured thereto by a pair of lock nuts 277. The bolts 275 serve to space the bars 271 and 272 outwardly a short distance from the I-beam 243 with said bars being disposed in a vertical plane and affording therebetween an elongated slot as indicated at 278. The arrangement is such that substantially all of the slot 278 is disposed beyond the I-beam 243 in a rearward direction, and it will be understood that the support weldment 270a similarly provides a forwardly projecting, vertically open slot.

The mounting pin 258 projects downwardly and loosely interfits the slot 278 with the mounting pin 259 similarly projecting downwardly through the similar slot afforded by the weldment 270a. As best shown in FIG. 27, the mounting pin 258 carries an annular collar 279 and a coil spring 280 which is interposed between said collar and the upper edges of the bars 271 and 272. As shown in FIG. 23, the mounting pin 259 similarly carries a fixed collar 281 and a coil spring 282. The springs 280 and 282 resiliently position the actuator frame which can move downwardly by compressing said springs, can move upwardly thereby pulling the mounting pins 258 and 259 upwardly within their slots, and can move laterally by said pins moving laterally along said elongated slots. This permits a floating action of frame 249 in its own plane.

The upper end of the actuator frame 249 is maintained by a pair of switch means 290 and 290a which are mirror images of each other and of which only the switch means 290 in FIG. 24 will be described in detail.

The switch means 290 comprises a rearwardly stepped mounting bracket 291 having an upright flange 292 carrying a switch 293. The bracket 291 is carried on the rearward face of the side plate 246 and carries a second bracket 294 (FIG. 23) which projects rearwardly and has a laterally outwardly projecting, U-shaped portion 295. The laterally outermost leg of said U-shaped portion 295, shown at 296, projects upwardly on the outer side of the mounting bar 257 and is disposed in lateral alignment with the switch 293 (FIG. 24). The swich 293 is provided with a plunger type operative member 297 which seats within a concave recess 298 of seat 299 welded to and carried by the inner surface of the mounting bar 257. As shown in FIG. 22, the switch means 290a is similarly provided with brackets 291a and 294a and a switch 293a. The switch 293a is mounted to a flange 292a, and the bracket 294a is provided with a U-shaped portion 295a having an outer leg 296a embracing the mounting bar 256. Also, the switch 293a has an operative member 297a which seats in a concave recess in a seat 299a. In FIG. 22, parts 290, 290' and 258 are respectively back of 290a, 290a' and 259.

FIG. 24 shows in detail the relative shapes of the seats and actuator members of both of the recited switches. The concave recess 298 or 298a is frusto-conical, and the distal ends of the operative members 297 or 297a are convexly rounded. It will be readily understood that any edgewise movement of the actuator frame will cause the seats to move out of alignment with the actuator members and this, in turn, will cause said operative members to move inwardly of the switches as said operative members ride up the sides of the concave recesses 298 or 298a. The outer legs 296 and 296a serve as back-up members which prevent lateral outward movement of the actuator frame 249 and the seats 299 or 299a. It will similarly be understood that any vertical movement of the actuator frame will likewise cause the operative members 297 or 297a to be depressed. And, of course, any movement of the actuators toward the switches 293 or 293a will press one or both of the operative members inwardly and actuate said switches. As hereinbefore stated, the mounting at the bottom of the actuator frame is such that said frame is free to move upwardly or downwardly or edgewise.

The function of the actuators 250–255 is to transmit any force applied to one of them to one of the limit switches thereby tripping the switch and causing the carrier to stop as in the previous embodiments of the invention. This tripping will be effected if the horizontal actuators 250 and 251 are struck from any of the directions indicated by the arrows A″, B″, C″ as shown in FIG. 28. Similarly, one of the limit switches will be actuated if any of the vertical actuators 252–255 are struck from any of the directions indicated by the arrows X″, Y″, or Z″. It will be further understood that due to the relationship between the concave seats and the convex actuators, said switches will be actuated by any blow against the frame 249 from any direction so long as the blow or force includes a component in the direction of the plane of the actuator frame sufficient to move said frame. As in the third embodiment of the invention, all of the limit switches of the fourth embodiment are connected in series with the electrical control system whereby if any one of them is tripped by an object striking or pressing against any one of the actuators, the carrier and/or the extractor automatically stops.

After the frame 249 strikes an object, such as a load oversized or improperly positioned, switch 293 or 293a will be actuated and the drive motor will be stopped and brakes applied. However, the momentum of the carrier and its parts may cause over-travel and the frame 249 can float a short distance thus preventing damage. The frame 249 being rigid will not deflect and fail to give a signal, as might happen with the cable 160 of an earlier described embodiment.

It will be understood that many changes in the details of the invention as herein described and illustrated may be made without, however, departing from the spirit thereof or the scope of the appended claims.

What is claimed is:

1. In a warehousing system which comprises a frame structure providing load support means having open load receiving ends defining a plane and there being a travel zone alongside of the plane and a load carrier movable parallel with the plane in the travel zone for delivering a load to or returning a load from a selected load support means and said carrier having transfer means for moving a load laterally into said frame structure; the combination therewith of a device comprising actuator means mounted to the carrier in use and disposed at the side of the carrier adjacent to said plane; said actuator means disposed generally parallel with the plane and defining the maximum height and width of a load to be moved onto said carrier; a control element mounted to the carrier and adapted to stop the carrier when said control element is tripped; said control element being responsive to said actuator means whereby when said actuator means is struck by a load moving onto said carrier, said control element is tripped.

2. In an automatic warehousing system which system comprises vertically and horizontally arranged load support means having open load receiving ends collectively defining a vertical plane and there being a travel zone alongside of said plane and a load carrier movable vertically and horizontally in said travel zone for delivering a load to or returning a load from any selected one of said load support means; the combination therewith of a load sensing device comprising a first elongated actuator means mounted to said carrier and disposed beyond the side of said carrier adjacent to said plane and ahead of a load on said carrier, in at least one horizontal direction of carrier travel; a second elongated actuator means mounted to said carrier and disposed beyond said side of said carrier adjacent to said plane and ahead of a load on said carrier, in at least one vertical direction of carrier travel; said first and second actuator means being disposed generally parallel with said plane and generally at right angles to said horizontal and vertical directions respectively whereby at least one of said actuator means sweeps across said plane generally at right angles to the direction of carrier travel, as said carrier moves, and strikes either a load protruding out of one of said load support means ahead of the moving carrier or a misplaced and protruding load just delivered by said carrier; a control element mounted to said carrier and operatively associated with said carrier whereby when said control element is tripped, said carrier stops; said control element being responsive to both of said actuator means whereby when either of said actuator means is struck, said control element is tripped and said carrier stops.

3. In an automatic warehousing system which system comprises vertically and horizontally arranged load support means having open load receiving ends collectively defining a vertical plane and there being a travel zone alongside of said plane and a load carrier movable upwardly and in a forward horizontal direction in said travel zone to any selected one of said load support means; the combination therewith of a load sensing device comprising a generally vertically disposed, elongated actuator means mounted to said carrier and disposed beyond the side of said carrier adjacent to said plane and forwardly of a load on said carrier; a generally horizontally disposed, elongated actuator means mounted to said carrier and disposed beyond the side of said carrier adjacent to said plane above a load on said carrier; both of said actuator means being disposed generally parallel with said plane whereby at least one of said actuator means sweeps across said plane generally at right angles to the direction of carrier travel, as said carrier moves, and strikes a load protruding out of one of said load support means and into the path of said one actuator means; a control element mounted to said carrier and operatively associated with said carrier whereby when said control element is tripped, said carrier stops; said control element being connected to both of said actuator means whereby when either of said actuator means is struck, said control element is tripped and said carrier stops.

4. A load sensing device as set forth in claim 3; said carrier including an extractor movable out of the side of said carrier at right angles to said plane and into any of said load support means for retrieving a load from said load support means and moving it onto said carrier; said control element being responsive to a load striking one of said actuators as said load is moving onto said carrier whereby said control element is tripped; said extractor being operatively associated with said control element whereby when said control element is tripped, said extractor stops.

5. In an automatic warehousing system which system comprises vertically and horizontally aligned load support means having open, load receiving ends defining a vertical plane and there being a travel zone alongside of said plane, a carrier comprising a horizontally movable frame movable horizontally in said travel zone, a vertically movable frame carried by said horizontally movable frame and having a forward end and an extractor movable laterally out of said vertically movable frame for depositing or picking up a load at any of said load support means; in combination therewith a load sensing device comprising a limit switch mounted to said vertically movable frame having an elongated wobble type operative member projecting laterally in the direction of extractor movement and having its distal end disposed adjacent to and directed toward said plane; generally vertical and horizontal, elongated actuators disposed parallel with said plane and adapted to sweep across said plane at right angles to the direction of movement of said vertically movable frame and strike objects projecting from said load support means; means connecting said actuators to said operative member to actuate said limit switch when said actuators are struck; and said carrier having power means responsive to said limit switch whereby when said limit switch is actuated, said power means is cut off and said carrier stops.

6. In a load sensing device as set forth in claim 5; said operative member being disposed at a predetermined height above said vertically movable frame and defining a maximum height for loads to be stored in said load support means, and being disposed vertically generally above forward end of said vertically movable frame; each said actuator being connected at one end thereof to the distal end of said operative member.

7. In a load sensing device as set forth in claim 6; mounting means connecting the opposite ends of each said actuator to said vertically movable frame for movement in the direction of its axis, said mounting means including spring means normally resiliently holding said actuators in a neutral position wherein said switch remains unactuated.

8. In a load sensing device as set forth in claim 7; said mounting means connecting said actuators for tilting movement perpendicular to their axes; said operative member connected to said limit switch for switch actuating movement in the direction of its axis and toward said limit switch whereby when a load moving onto said vertically movable frame strikes one of said actuators, said actuator is tilted and said operative member is moved inwardly to actuate said switch.

9. In an automatic warehousing system which system comprises vertically and horizontally aligned load support means having open load receiving ends collectively defining a vertical plane and means providing a travel zone alongside of said plane, a load carrier vertically and horizontally movable in said travel zone in use of said carrier; said carrier comprising a main frame having a load receiving and discharging side disposed adjacent to said plane; an extractor frame carried by said main frame and movable out of said load receiving and discharging side into any of said load support means for depositing a load at or retrieving a load from said load support means; the combination therewith of a load sensing device comprising a pair of upright members on said main frame disposed on either side of said extractor frame and spaced from said load receiving and discharging side; arm members projecting generally horizontally from upwardly spaced portions of said upright members in the direction of said load receiving and discharging side with the distal ends of said members disposed above said load receiving and discharging side; said distal ends of said arm members providing cable guide means; a taut, flexible cable strung upwardly from said main frame in such manner as to define a planar, inverted U-shape across said load receiving and discharging side parallel with and closely adjacent to said plane; a control element carried by said main frame and actuable to stop the movement of said carrier; said cable operatively connected to said control element whereby when said cable is deflected by engagement with a load moving onto or off of said carrier, said control element is actuated, and said carrier is stopped.

10. In an automatic warehousing system which system comprises vertically and horizontally aligned load support means having open, loading receiving ends defining a vertical plane and there being a travel zone alongside of said plane, a carrier comprising a horizontally movable frame, a vertically movable frame carried by said horizontally movable frame, and an extractor movable laterally along a path out of and into said vertically movable frame for transferring a load between said load support means and said carrier; the combination therewith of a load sensing device comprising vertical and horizontal, rodlike actuators forming an inverted, U-shaped frame disposed over and transverse to said path adjacent to said plane, said U-shaped frame defining the maximum permissible width and height of a load moving onto said carrier; said U-shaped frame disposed parallel with said plane in a clearance space defined between said carrier and said load support means and adapted to sweep across said plane and strike objects projecting from said load support means into said clearance space; a pair of limit switches mounted to said vertically movable frame on either side of said path, either said switch being actuatable to stop said carrier and said extractor; means connecting said limit switches to said vertical actuators intermediate the ends of said vertical actuators whereby when said U-shaped frame strikes an object projecting from said load support means or when said U-shaped frame is struck by an oversized or skewed load moving onto said carrier, at least one of said limit switches is actuated and said carrier is stopped.

11. In an automatic warehousing system which system comprises vertically and horizontally arranged load support means having open load receiving ends collectively defining a vertical plane, there being a travel zone alongside of said plane and a load carrier movable vertically in an initial upward direction and horizontally in an initial forward direction, in said travel zone, for delivering a load to or returning a load from any selected one of said load support means; the combination therewith of a load sensing device comprising a pair of elongated actuators defining an inverted, L-shaped actuator frame mounted to said carrier and disposed beyond the side of said carrier adjacent to and parallel with said plane, a first of said actuators being vertically disposed, ahead of a load on said carrier in said forward direction, and a second of said actuators being horizontally disposed, ahead of a load on said carrier in said upward direction; a control element mounted to said carrier whereby when said control element is tripped, said carrier stops; said control element being responsive to both of said actuators whereby when either of said actuators is struck, said control element is tripped and said carrier stops; said actuators adapted to sweep across said plane generally at right angles to the direction of carrier travel and detect and strike objects protruding from said support means into the path of one of said actuator means; said second actuator having an extension portion extending forwardly beyond said first actuator; and an auxiliary actuator depending from the end of said extension portion whereby the effective reach of said actuator frame is extended in a forward direction.

12. In an automatic warehousing system which system comprises vertically and horizontally arranged load support means having open load receiving ends collectively defining a vertical plane, there being a travel zone alongside of said plane and a load carrier movable vertically and horizontally in said travel zone, for delivering a load to or returning a load from any selected one of said load support means; the combination therewith of a load sensing device comprising elongated actuators defining an inverted, U-shaped actuator frame mounted to said carrier and disposed beyond the side of said carrier adjacent to and parallel with said plane, a pair of said actuators being vertically disposed ahead of a load on said carrier in either horizontal direction, and one of said actuators being horizontally disposed, ahead of a load on said carrier in an upward direction; a control element mounted to said carrier and operatively associated with said carrier whereby when said control element is tripped, said carrier stops; said control element being responsive to all of said actuators whereby when one of said actuators is struck, said control element is tripped and said carrier stops; said actuators adapted to sweep across said plane generally at right angles to the direction of carrier travel and detect and strike objects protruding from said support means into the path of one of said actuator means; said one actuator having an extension portion extending beyond one of said pair of actuators in one horizontal direction of travel; and an auxiliary actuator depending from the end of said extension portion whereby the effective reach of said actuator frame is extended in said one horizontal direction of travel.

13. A load sensing device for use in an automatic warehousing system which system comprises a load support means having open, load receiving ends collectively defining a plane and there being a travel zone alongside of said plane and a load carrier movable parallel with said plane in said travel zone for delivering a load to or returning a load from any selected one of said load support means; said device comprising a flat frame made of elongated actuators, said frame being movably mounted to said carrier and disposed beyond the side of said carrier parallel with and adjacent to said plane for sweeping across said plane as said carrier moves and striking a load protruding out of one of said load support means into the path of said actuators; at least one limit switch mounted to said carrier and operatively associated therewith whereby when said switch is tripped, said carrier stops; said switch having an operative member projecting toward said frame; said frame having a concave seat member seating the end of said operative member; and backup means fixed relative to said switch and holding said frame against movement away from said operative member but allowing movement of said frame in its own plane, such movement causing displacement of said concave seat thereby camming said operative member inwardly and actuating said switch.

14. A load sensing device as set forth in claim 13; said frame being substantially rectangular in shape; and means mounting the lower end of said frame to said carrier for movement of said frame in its own plane only.

15. A load sensing device as set forth in claim 13; said frame being substantially rectangular in shape; there being one of said limit switches mounted to said carrier adjacent to each upper corner of said frame; said frame carrying one of said seat members for each of said limit switches; the lower end of said frame carrying depending pin means; and means defining elongated, vertically open slot means carried by said carrier, said pin means slidably disposed downwardly through said slot means.

16. A load sensing device as set forth in claim 15; spring means carried by said pin means and disposed above said slot means for affording resilient, downward movement to said frame.

17. A load sensing device for use in an automatic warehousing system which system comprises a load support means having open, load receiving ends collectively defining a plane and there being a travel zone alongside of said plane and a load carrier movable parallel with said plane in said travel zone for delivering a load to or returning a load from any selected one of said load support means; said device comprising a flat frame, said frame being movably mounted to said carrier and disposed beyond the side of said carrier parallel with and adjacent to said plane for sweeping across said plane as said carrier moves and striking a load protruding out of one of said load support means into the path of said frame; at least one switching means mounted to said carrier and operatively associated with said carrier whereby when said switching means is tripped, said carrier stops; said frame mounted to said carrier for movement in its own plane relative to said carrier; and said switching means having an operative member positioned to be engageable by movement of said frame in said plane and to be moved into carrier-stopping position.

18. A load sensing device as defined in claim 17, wherein said frame is rigid; and said mounting on said carrier permits movement of said frame in its own plane.

19. A load sensing device as defined in claim 17, wherein said frame is rigid; and said mounting on said carrier permits movement of said frame in its own plane and also at right angles to said plane.

References Cited

UNITED STATES PATENTS

| | | | |
|---|---|---|---|
| 324,751 | 8/1885 | Curtiss | 187—41 |
| 367,450 | 8/1887 | Senior | 187—40 |
| 443,282 | 12/1890 | Holmes | 187—41 |
| 1,436,137 | 11/1922 | Aldred | 187—41 |
| 3,049,247 | 8/1962 | Lemelson | 214—16.4 |
| 3,206,041 | 9/1965 | McGrath | 214—8.5 |

GERALD M. FORLENZA, *Primary Examiner.*

R. B. JOHNSON, *Assistant Examiner.*